United States Patent [19]
Pray

[11] 3,871,723
[45] Mar. 18, 1975

[54] MULTI-PURPOSE BEARING MOUNT

[76] Inventor: Percy E. Pray, 912 Third Ave., South, Minneapolis, Minn. 51515

[22] Filed: Dec. 12, 1973

[21] Appl. No.: 424,090

[52] U.S. Cl. .................................. 308/15, 248/56
[51] Int. Cl. ........................................ F16c 35/12
[58] Field of Search ........... 308/15, 31, 34; 248/56, 248/57, 207, 274

[56] References Cited
UNITED STATES PATENTS
| | | | |
|---|---|---|---|
| 3,026,152 | 3/1962 | Liggio | 308/15 |
| 3,695,562 | 10/1972 | Daniel | 308/15 |

Primary Examiner—M. Henson Wood, Jr.
Assistant Examiner—Robert Saifer
Attorney, Agent, or Firm—Merchant, Gould, Smith & Edell

[57] ABSTRACT

A multi-purpose bearing mount having a bearing seat for receiving a bearing insert. The bearing seat is contained in a mounting block having a plurality of machined mounting surfaces and securing means for selectively attaching the block to a support member with the bearing axis of rotation in a selected orientation relative to the support member surface.

4 Claims, 8 Drawing Figures

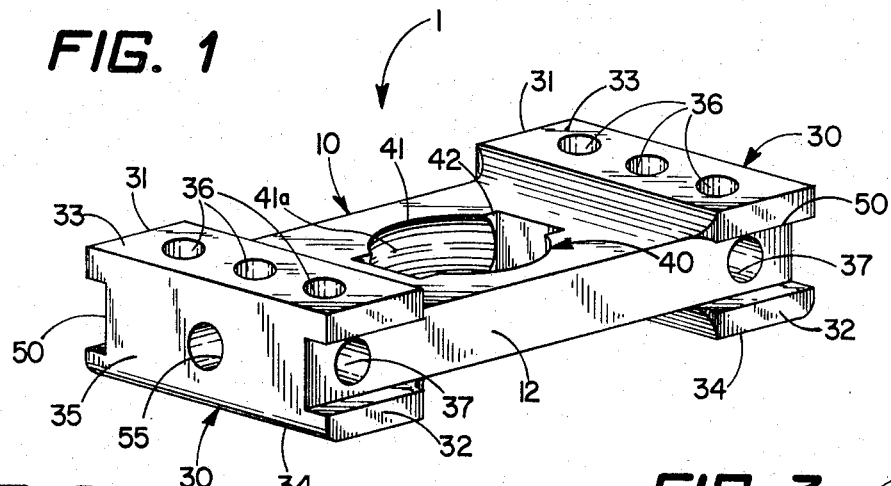
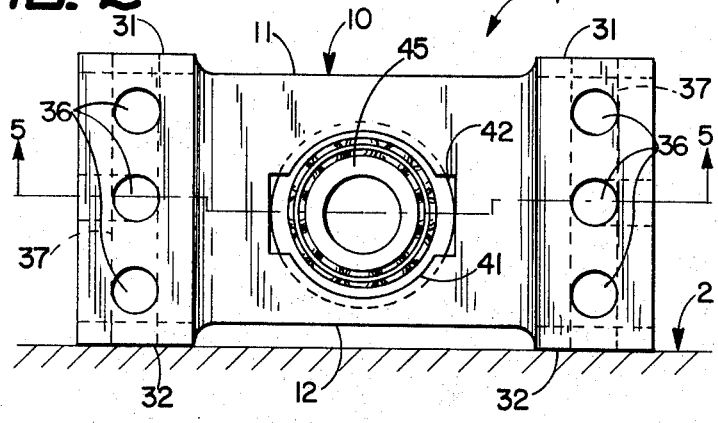
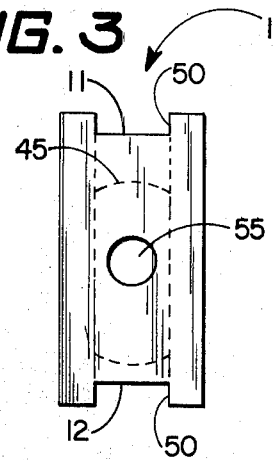
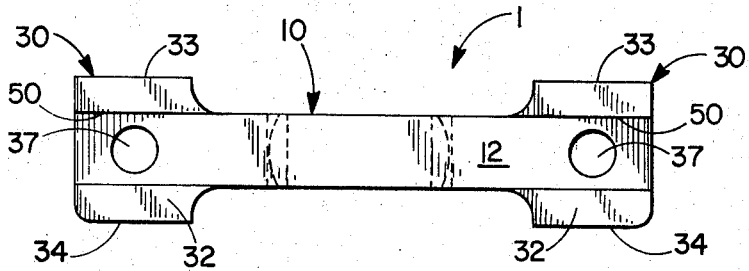
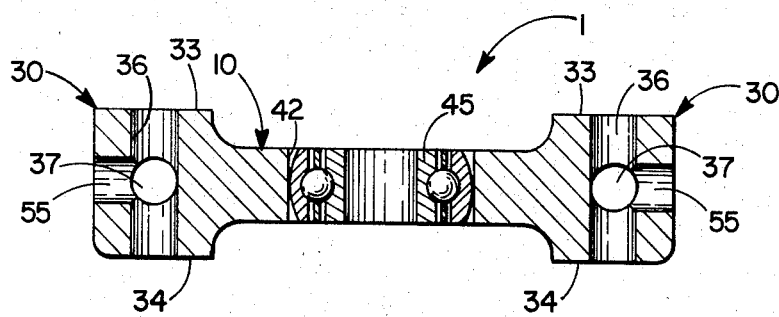

MULTI-PURPOSE BEARING MOUNT

BACKGROUND OF THE INVENTION

1. Field of the Invention

The present invention relates to a bearing mount for selectively locating a bearing on a support member for supporting a rotating shaft.

2. Description of the Prior Art

Various devices are currently available for mounting a bearing or bearing insert on a support member. The support surface of the support member may be oriented in any number of ways. These units come in various sizes and embodiments for mounting bearings to support members with the bearing axis of rotation in selected orientation with respect to the support member surface. Because of the almost limitless number of bearing mounting applications which are likely to arise, it is currently necessary to make a single selection from this multiplicity of bearing mounting sizes and embodiments for each bearing mounting requirement. For example, where a bearing is to be mounted to a support surface with the bearing axis of rotation oriented perpendicular to the support surface, a flange type bearing mount would have to be selected. Where a bearing is to be mounted between two side supports with a rotating shaft extending between the supports, a take-up type bearing support unit would be used. And where a bearing is to be mounted on a support surface with the bearing axis of rotation parallel to the support surface, the conventional pillow-block bearing housing would be used.

Because currently available bearing mounts have only one mounting orientation, it is necessary to maintain a large number of different bearing mounts in storage. Further, when a particular mount is no longer needed, but still functions properly, its uniqueness prevents its reuse in an available job which has a different shaft-orientation requirement.

SUMMARY OF THE INVENTION

The present invention is a multi-purpose bearing mount for positioning a bearing on a support surface with the bearing axis of rotation in one of several selected orientations with respect to the support surface. The bearing mount comprises a web member supported between two mounting flanges. A bearing insert may be placed in a bearing seat located in the web member with the bearing axis of rotation generally perpendicular to the web member.

The mounting flanges have several mutually perpendicular mounting surfaces and various bolt holes for securing the bearing mount to a support surface in a variety of orientations. When the mount is positioned with the bearing axis of rotation oriented generally parallel to the support surface, the operation of the bearing mount is similar to that of the conventional pillow-block bearing mount. In this orientation, the rotating shaft supported in the bearing is positioned generally parallel to the support surface.

When the mount is positioned with the bearing axis of rotation oriented generally perpendicular to the support surface, the function of the bearing mount is analogous to that of the conventional flange type bearing block in that the rotating shaft supported in the bearing is generally perpendicular to the support surface. To provide added utility to the bearing mount, the bearing seat is located off-center in the web member. This allows the bearing insert to be changed from a "high" to a "low" position relative to the support surface by using opposite mounting surfaces of the bearing block to abut the support surface. In addition, mounting channels are formed in two opposed sides of the bearing mount so that it can be slidably positioned between opposed support edges or rails to operate as a conventional take-up type of bearing mount.

This multiplicity of purpose in a single mounting block reduces the need for resort to the several different types of bearing support mounts now available, each of which serves only a single purpose. Thus, the number of bearing mounts which must be maintained in storage is reduced and the bearing mounts may be recycled to different uses as the need arises. The simplicity of the present multi-purpose bearing block allows it to be economically manufactured in various sizes and configurations. It is also amenable for use with various adaptor sleeves suitable for positioning different size bearing inserts into the same bearing seat.

BRIEF DESCRIPTION OF THE DRAWINGS

FIG. 1 is a perspective view of the multi-purpose bearing mount;

FIG. 2 is a top plan view of the multi-purpose bearing mount;

FIG. 3 is an end elevational view of the multi-purpose bearing mount;

FIG. 4 is a side elevational view of the multi-purpose bearing mount;

FIG. 5 is a sectional view of the multi-purpose bearing mount along the line 5—5 in FIG. 2;

DETAILED DESCRIPTION OF THE PREFERRED EMBODIMENT

Figure 6:
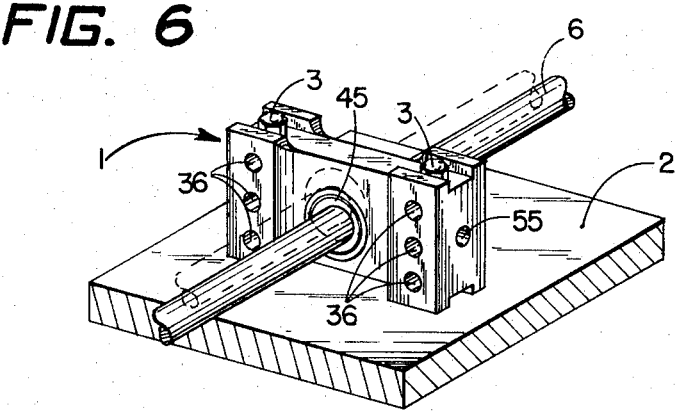
FIG. 6 is a perspective view showing the multi-purpose bearing mount utilized as a pillow-block mount.

Referring to FIGS. 1–5 wherein like numerals refer to like structural elements, a preferred embodiment of bearing mount 1 comprises a web member 10 integrally attached to two mounting flanges, each generally designated by the numeral 30. Web member 10 contains a self-aligning bearing seat 40 for receiving a bearing insert 45. While a bearing seat may be utilized which is not self-aligning, the self-aligning feature enhances the versatility of the bearing mount 1. A self-aligning bearing seat allows the axis of rotation of the bearing contained in it to pivot somewhat about the bearing center of rotation. In this way, the bearing can support a rotating shaft whose axis is not perfectly perpendicular to the bearing mount web.

Bearing mount 1 can be attached to support surfaces in different orientations to thereby selectively orient the axis of rotation of the bearing insert 45 with respect to the support surface. These orientations are shown generally in FIGS. 6–8. To avoid confusion of terminology, it should be noted that the support surface to which the bearing mount 1 is attached may have any number of different orientations with respect to the horizontal. Thus, while the support surface 2 in FIG. 6 is shown as being generally horizontal, it may in fact be oriented in any direction. This orientation of the support surface to the horizontal is not critical to the operation of the present invention. What is important, is the orientation of the rotating shaft with respect to the support surface. It is the selection of this orientation that the bearing mount 1 is intended to achieve.

In the preferred embodiment of FIG. 1, web member 10 and mounting flanges 30 comprise a unitary member which can be cast, machined, or otherwise formed. Web member 10 may have different shapes than that shown in the Figures and the method of attachment between mounting flanges 30 and web member 10 may be different from those shown without affecting the performance of the present invention. Self-aligning bearing seat 40 which extends through web member 10 is of a conventional design. It is comprised of a generally circular opening 41 extending through web member 10 with concave surfaces 41a. Two adjoining slots 42 are oppositely disposed on the edge of opening 41. In this configuration, a bearing insert 45 is easily positioned in bearing seat 40 by means of the slot 42. When the bearing insert 45 is positioned in bearing seat 40, it generally lies in a plane parallel to the plane of web member 10. When such a self-aligning bearing seat is used, the bearing insert is free to rotate a limited amount in the seat. As was noted above, this allows the bearing insert to position itself in response to slight movements of the longitudinal axis of the shaft which is supported in the bearing insert. The center of opening 41 (which corresponds with the center of rotation of bearing insert 45 placed in it) is located off-center between web member surfaces 11 and 12. The purpose of this off-center positioning will be described in detail later.

It is the purpose of the present invention to combine the functions of several different types of bearing mounting units into one multi-purpose unit. Multipurpose bearing mount 1 performs the same mounting functions as the conventional pillow-block bearing mount, the flange bearing mount and the take-up bearing mount.

To support bearing insert 45 in a manner similar to that of the conventional pillow-block, with the axis of rotation of bearing insert 45 generally parallel to the support surface 2, smooth flat mounting surfaces, each designated by the numerals 31 and 32 are provided at either side of each of the mounting flanges 30. These are shown in FIG. 2. Mounting surfaces 31 and 32 provide a stable and accurate mounting interface between the bearing mount 1 and the support surface 2. Since the bearing seat 40 is off-center between mounting surfaces 31 and 32, by changing the surface of flange 30 upon which the bearing mount rests, the height of the bearing seat 40 above the support surface 2 will be varied. This provides two different positions (high and low) for the bearing insert 45 when bearing mount 1 is mounted with web 10 generally perpendicular to the support surface 2. The high position of bearing seat 40 is shown by dotted lines in FIG. 6.

To secure bearing mount 1 to a support surface 2 with either flange sides 31 or 32 abutting the support surface, holes 37 extend through mounting flanges 30 from sides 31 to sides 32. Bolts or pins, each designated by the numeral 3, may be inserted through holes 37 to hold the bearing mount 1 firmly to the support surface 2 on which it rests. In the embodiment shown in the Figures, three holes 37 are provided in each of flanges 30, but a different number or a different securing method may also be used.

Figure 7:
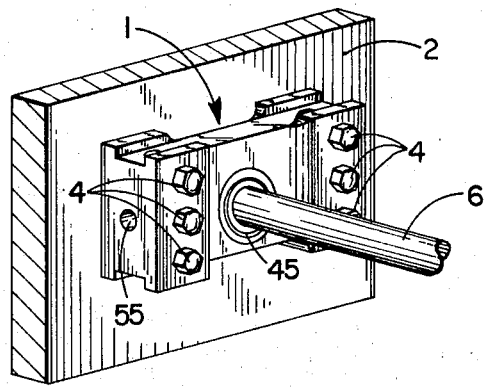
FIG. 7 is a perspective view showing the multi-purpose bearing mount utilized as a flange-type mount.
Figure 8:
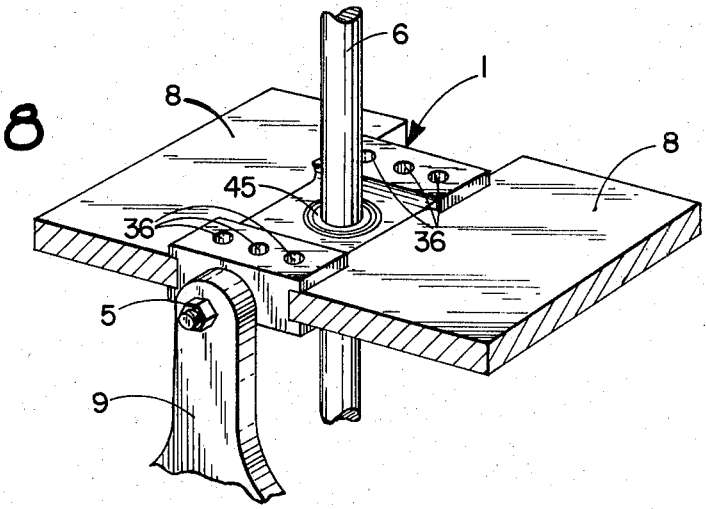
FIG. 8 is a perspective view showing the multi-purpose bearing mount utilized as a take-up mount.

To utilize the bearing mount 1 in a manner similar to that of the conventional flange-type unit, mounting flanges 30 are each provided with smooth flat mounting surfaces, each designated by the numeral 33, for abutting engagement with support surface 2 (see FIG. 7). Holes 36 extend through mounting flanges 30 between front and back surfaces 33 and 34 respectively. Pins or bolts 4 may be inserted through holes 36 to secure the bearing mount 1 on the support surface 2. In this orientation, the axis of rotation of bearing insert 45 is centered on a line generally perpendicular to the support surface 2. While FIGS. 1 and 2 show three holes 36 in each of mounting flanges 30, a different number of holes or a different securing method may also be used. For instance, to achieve additional flexibility in the positioning of the center of rotation of bearing insert 45, it may be desirable that one of the holes 36 be an arcuate slot opening (not shown) instead of a circular bore. In this arrangement, the radius line (not shown) of such arcuate slot would pass through the center of rotation of insert 45 and also through one of the holes 36 on the flange opposite the flange containing the arcuate slot. By positioning one bolt in the opposite flange hole, the bearing mount 1 could be pivoted about that point until the center of rotation of insert 45 is positioned exactly where it is desired and the bolt or pin through the arcuate slot could then be tightened.

To achieve a function analogous to that provided by conventional take-up bearing mount units, where the mount is positioned between opposed support members 8, bearing mount 1 has two mounting channels 50 formed on either side of web member 10 and extending through mounting flanges 30. In the embodiment shown in FIGS. 1-5, channel 50 has a rectangular cross-section with a portion of the channel base formed by the sides 11 and 12 of web member 10. Where channels 50 extend through flanges 30, an opening in flange sides 31 and 32 is formed. It is the purpose of channels 50 to allow the bearing mount 1 to be mounted between two opposed support members 8 (see FIG. 8) which would fit into the channels 50. In this way the bearing mount 1 could slide along and between the opposed support members 8 inserted in channels 50 in response to movement of the rotating shaft 6 mounted in the bearing insert 45. Such a need may arise where a long shaft 6 requires bearing support near its center, yet where there is some lateral movement of the shaft 6 at the bearing support point. Where there is not such movement, the bearing mount 1 remains stationary between the support members 8. In the event that it is desired to attach the bearing mount 1 to a second support member 9 while it is located between the opposed support members 8, hole 55 extending into mounting flange 30 from flange end 35 can be used for inserting a securing bolt or pin 5 therethrough to be attached to the support element 9.

The operation of the bearing mount 1 can be summarized as follows. A bearing insert 45 is positioned in self-aligning bearing seat 40. By the use of adapting sleeves (not shown), various size bearing inserts 45 may be inserted into the same self-aligning bearing seat 40. The bearing insert 45 may be a ball bearing or other type bearing. The rotating shaft 6 to be supported extends through the center of the bearing insert 45.

To use bearing mount 1 as a pillow-block type unit, it is positioned on a support member with either of the pairs of flange mounting surfaces 31 or 32 in abutting engagement with the support surface 2. In this orientation (see FIG. 6), the axis of rotation of bearing insert 45 is centered on a line which is generally parallel to the support surface 2. The supported shaft 6 then extends generally parallel to the support surface 2. To secure the bearing mount 1 in this position, bolts or pins 3 are extended through holes 37 and attached to the support member. Because the rotational center of the self-aligning bearing seat 40 is off-center between mounting surfaces 31-32, by selecting either of flange mounting surfaces 31 or 32 as the abutting surface, the height of the rotational center of bearing insert 45 above the support surface 2 can be varied. This allows the bearing mount 1 to be used to support a shaft 6 at either of two heights (high or low) above the support surface 2. The high position is shown by dotted lines in FIG. 6.

To use the bearing mount 1 as a flange-type mounting unit, it is positioned on the support member with the mounting surfaces 33 of flanges 30 in abutting engagement with the support surface 7. In this orientation (see FIG. 7), the axis of rotation of bearing insert 45 is positioned on a line which is generally perpendicular to the support surface 7. This supports the rotating shaft 6 in a position generally perpendicular to the support surface 7. The bearing mount 1 is held in this position by extending pins or bolts 4 through holes 36 in flanges 30 and attaching them to the support member.

To use the bearing mount 1 as a take-up mounting unit, it is positioned between two opposed support members 8 by inserting the support member edges into mounting channels 50. In this orientation, the axis of rotation of bearing insert 45 is centered on a line extending between the opposed support members 8 and generally perpendicular to a plane extending between these opposed support members (see FIG. 8). If it is desired that the bearing mount be free to slide between the support members in response to movement of the rotating shaft 6, the bearing mount 1 is merely left loose to slide between the support members 8. Where it is desired that the bearing mount 1 be secured in place while positioned between the opposed support members, a bolt or pin 5 can be extended through either or both of holes 55 in flanges 30 and attached to a second support member 9 to secure the bearing mount 1 in position with respect to that support member.

What is claimed is:

1. A bearing mount capable of being mounted in a plurality of optional orientations relative to a support surface, said bearing mount comprising:
    a. a web member extending between two mounting flanges;
    b. a bearing seat located in said web member for receiving a bearing therein with the bearing axis of rotation generally perpendicular to said web member;
    c. each of said flanges having first and second mutually perpendicular mounting surfaces lying in planes removed from said web member, said first mounting surface generally parallel to said web member; and
    d. means for selectively securing said bearing mount to the support surface with one of said first or second mounting surfaces of each flange abutting the support surface.

2. The bearing mount of claim 1 including two opposed mounting channels, each having an open side for receiving portions of a support surface therein, said open side lying in a plane generally perpendicular to said web member.

3. The bearing mount of claim 2 wherein:
    a. each of said mounting flanges have a third mounting surface opposite said second surface and in a plane removed from said web member;
    b. said bearing seat is located off-center between said opposed second and third flange mounting surfaces; and including
    c. means for securing said bearing mount to the support surface with said third mounting surfaces abutting the support surface.

4. The bearing mount of claim 3 wherein said bearing seat is a self-aligning bearing seat.

* * * * *